United States Patent
Lee

(10) Patent No.: US 9,591,301 B2
(45) Date of Patent: Mar. 7, 2017

(54) APPARATUS AND METHOD FOR CALIBRATING A CAMERA

(71) Applicant: ELECTRONICS AND TELECOMMUNICATIONS RESEARCH INSTITUTE, Daejeon (KR)

(72) Inventor: Joo-Haeng Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/834,297

(22) Filed: Aug. 24, 2015

(65) Prior Publication Data

US 2016/0227207 A1    Aug. 4, 2016

(30) Foreign Application Priority Data

Feb. 3, 2015    (KR) .................. 10-2015-0016994

(51) Int. Cl.
*H04N 17/00* (2006.01)
*G06T 7/00* (2006.01)

(52) U.S. Cl.
CPC ......... *H04N 17/002* (2013.01); *G06T 7/0018* (2013.01)

(58) Field of Classification Search
CPC .................. H04N 17/002; H04N 5/23229
See application file for complete search history.

(56) References Cited

U.S. PATENT DOCUMENTS

| | | | | |
|---|---|---|---|---|
| 7,119,833 B2* | 10/2006 | Jaynes | ............. | H04N 5/74 348/189 |
| 7,671,891 B2 | 3/2010 | Fitzgibbon et al. | | |
| 8,564,670 B2* | 10/2013 | Kim | ............. | G06T 7/0018 348/180 |
| 9,160,946 B1* | 10/2015 | Semenov | ............. | H04N 5/357 |
| 9,160,979 B1* | 10/2015 | Ulmer | ............. | H04N 7/18 |
| 9,161,027 B2* | 10/2015 | Lee | ............. | H04N 17/002 |
| 2001/0010514 A1* | 8/2001 | Ishino | ............. | G06F 3/0325 345/158 |

(Continued)

FOREIGN PATENT DOCUMENTS

| | | |
|---|---|---|
| KR | 10-2012-0071224 A | 7/2012 |
| KR | 10-2013-0009603 A | 1/2013 |

OTHER PUBLICATIONS

Zhang, "A Flexible New Technique for Camera Calibration" IEEE Transactions on Pattern Analysis and Machine Intelligence, Nov. 2000, pp. 1330-1334, vol. 22 No. 11, IEEE.

(Continued)

*Primary Examiner* — Brian Yenke

(57) ABSTRACT

An apparatus for calibrating a camera comprises a camera; an input unit configured to receive a segmentation diagonal ratio of the environment quadrangle; a memory configured to store a program; and a processor configured to perform camera calibration based on the program, wherein the program is configured to: extract diagonal parameters of a centered quadrangle from the image; estimate length of a projection center line; estimate a projection angle; estimate an angle between diagonals of a projection quadrangle; estimate a projection center point; and estimate extrinsic and intrinsic parameters of the camera.

18 Claims, 10 Drawing Sheets

(56) References Cited

U.S. PATENT DOCUMENTS

| | | | | |
|---|---|---|---|---|
| 2002/0107069 A1* | 8/2002 | Ishino | ............... | A63F 13/04 |
| | | | | 463/30 |
| 2003/0011566 A1* | 1/2003 | Gomi | ............... | G06F 3/0425 |
| | | | | 345/157 |
| 2005/0190986 A1* | 9/2005 | Sakurai | ............... | G06T 3/0006 |
| | | | | 382/275 |
| 2008/0240616 A1* | 10/2008 | Haering | ............... | G06K 9/00771 |
| | | | | 382/294 |
| 2010/0295948 A1* | 11/2010 | Xie | ............... | G06T 7/0018 |
| | | | | 348/175 |
| 2010/0322482 A1* | 12/2010 | Kochi | ............... | G01C 11/06 |
| | | | | 382/106 |
| 2012/0162441 A1 | 6/2012 | Kim et al. | | |
| 2013/0016223 A1 | 1/2013 | Kim et al. | | |
| 2013/0070108 A1* | 3/2013 | Aerts | ............... | G06T 7/002 |
| | | | | 348/187 |
| 2014/0285778 A1* | 9/2014 | Inoue | ............... | H04N 9/3185 |
| | | | | 353/70 |

OTHER PUBLICATIONS

Kim et al., "Estimating Intrinsic Parameters of Cameras using Two Arbitrary Rectangles" Proceedings of the 18th International Conference on Pattern Recognition (ICPR'06), 2006, pp. 1-4, IEEE Computer Society.

Lee, "New Geometric Interpretation and Analytic Solution for Quadrilateral Reconstruction" 2014 22nd International Conference on Pattern Recognition, Aug. 24, 2014, pp. 4015-4020, IEEE Computer Society.

* cited by examiner

APPARATUS AND METHOD FOR CALIBRATING A CAMERA

CROSS REFERENCE TO RELATED APPLICATION

This application claims the benefit of Korean Patent Application No. 10-2015-0016994, filed on Feb. 3, 2015, entitled "Apparatus and method for calibrating a camera", which is hereby incorporated by reference in its entirety into this application.

BACKGROUND OF THE INVENTION

1. Technical Field

Exemplary embodiments of the present invention relate to a camera calibration technology and more particularly, to a calibration technology which estimates intrinsic and extrinsic parameters of a camera.

2. Description of the Related Art

A camera calibration is defined as to find out an intrinsic construction (for example, lens properties and imaging methods) and an extrinsic construction (for example, position and direction of a camera). It is a major technical issue in a field of computer vision. It is also a core element technology in fields of geometric camera, robot navigation, 3D reconstruction, and augmented reality whose interest has been increased recently.

Information on a camera intrinsic construction is not explicitly known if not an expensive one, and it is not easy to measure information on a camera extrinsic construction except a special case. Accordingly, a variety of methods to measure such intrinsic and extrinsic construction information are suggested, which usually use a singular image for three-dimensional object constructed precisely in advance or a plurality of images for a checkerboard whose size is known.

However, the three-dimensional object is so complicated that it is not easy to use it in a normal environment and that it is not proper to apply to a cheap camera such as a smart phone camera. While a method to use a plurality of images for a simple checkerboard is most widely used, such a method takes a long time comparatively to measure so that it is not easy to apply to a real time application.

SUMMARY OF THE INVENTION

In view of the above, the present invention provides an apparatus and a method for calibrating a camera which is able to perform camera calibration using a singular image including a quadrangle.

According to an aspect of the present invention, there is provided an apparatus for calibrating a camera comprising: a camera configured to generate an image by photographing an environment quadrangle; an input unit configured to receive a segmentation diagonal ratio of the environment quadrangle; a memory configured to store a program for camera calibration; and a processor configured to perform camera calibration based on the program, wherein the program is configured to: extract diagonal parameters of a centered quadrangle from the image; estimate length of a projection center line based on the segmentation diagonal ratio of the environment quadrangle and the diagonal parameters of the centered quadrangle; estimate a projection angle corresponding to each diagonal of the centered quadrangle based on the length of the projection center line; estimate an angle between diagonals of a projection quadrangle based on the projection angle and an angle between diagonals of the centered quadrangle; estimate a projection center point based on the projection angle, the angle between diagonals of the centered quadrangle and the angle between diagonals of the projection quadrangle; and estimate extrinsic and intrinsic parameters of the camera corresponding to the projection center point and the centered quadrangle.

The diagonal parameter may comprise the angle between diagonals of the centered quadrangle and the segmentation diagonal ratio.

The projection angle may be an angle between the projection center line and the diagonal of the environment quadrangle.

The program may be configured to: estimate a homography between the centered quadrangle and the projection quadrangle; and recover the environment quadrangle by applying the homography to the image quadrangle.

The program may be configured to estimate length of the projection center line by the following Equation:

$$d = \sqrt{\frac{A_{p,0}}{A_{p,1}}}$$

where $A_{p,0} = m_0^2(1 - m_1\alpha_{p,1})^2\beta^2 - m_1^2(1 - m_0\alpha_{p,0})^2$ and $A_{p,1} = m_0^2\alpha_{p,0}^2(1 - m_1\alpha_{p,1})^2\beta^2 - m_1^2(1 - m_0\alpha_{p,0})^2\alpha_{p,1}^2$.

wherein the is $m_0$ is a segmentation diagonal ratio to one diagonal of the projection quadrangle, the $m_1$ is a segmentation diagonal ratio to the other diagonal of the projection quadrangle, $\beta$ is a value obtained by dividing the segmentation diagonal ratio to one diagonal of the centered quadrangle by the segmentation diagonal ratio to the other diagonal of the centered quadrangle.

The program may be configured to estimate the projection angle by the following Equation:

$$\cos\theta_i = \frac{m_{i+2}l_i - m_i l_{i+2}}{m_i m_{i+2}(l_i + l_{i+2})}d = \alpha_{p,i}d$$

wherein the $m_i$ is a segmentation diagonal ratio to one diagonal of the projection quadrangle, the $m_{i+2}$ is a segmentation diagonal ratio to the other diagonal of the projection quadrangle, the $l_i$ is a segmentation diagonal ratio to one diagonal of the centered quadrangle, the $l_{i+2}$ is a segmentation diagonal ratio to the other diagonal of the centered quadrangle, d is length of the projection center line, the $\theta_i$ is a projection angle corresponding to each diagonal of the centered quadrangle, the i is 0 or 1.

The program may be configured to estimate the angle between the diagonals by the following Equation:

$$\cos\phi = \cos\rho \sin\theta_0 \sin\theta_1 + \cos\theta_0 \sin\theta_1$$

wherein the $\rho$ is an angle between the diagonals of the centered quadrangle, the $\phi$ is an angle between diagonals of the projection quadrangle, the $\theta_0$ is a projection angle corresponding to one diagonal of the centered quadrangle, $\theta_1$ is a projection angle corresponding to the other diagonal of the centered quadrangle.

The program may be configured to estimate the projection center point by the following Equation:

$$P_c = \frac{d(\sin\phi\cos\theta_0\cos\theta_1 - \cos\phi\cos\theta_0\sin\rho\sin\theta_0\sin\theta_1)}{\sin\phi}$$

wherein $P_c$ is a projection center point, the ρ is an angle between the diagonals of the centered quadrangle, the φ is an angle between diagonals of the projection quadrangle, the $θ_0$ is a projection angle corresponding to one diagonal of the centered quadrangle, $θ_1$ is a projection angle corresponding to the other diagonal of the centered quadrangle, d is length of the projection center line.

According to another aspect of the present invention, there is provided a method for calibrating a camera comprising: receiving an image of an environment quadrangle and a segmentation diagonal ratio of the environment quadrangle;

extracting diagonal parameters of a centered quadrangle from the image; estimating length of a projection center line based on the segmentation diagonal ratio of the environment quadrangle and the diagonal parameters of the centered quadrangle; estimating a projection angle corresponding to each diagonal of the centered quadrangle based on the length of the projection center line; estimating an angle between diagonals of a projection quadrangle based on the projection angle and an angle between diagonals of the centered quadrangle; estimating a projection center point based on the projection angle, the angle between diagonals of the centered quadrangle and the angle between diagonals of the projection quadrangle; and estimating extrinsic and intrinsic parameters of the camera corresponding to the projection center point and the centered quadrangle.

The diagonal parameter may comprise the angle between diagonals of the centered quadrangle and the segmentation diagonal ratio.

The projection angle may be an angle between the projection center line and the diagonal of the environment quadrangle.

The method for calibrating a camera may further comprise estimating a homography between the centered quadrangle and the projection quadrangle; and recovering the environment quadrangle by applying the homography to the image quadrangle.

The step for estimating length of a projection center line based on the segmentation diagonal ratio of the environment quadrangle and the diagonal parameters of the centered quadrangle may comprise estimating length of a projection center line by the following Equation:

$$d = \sqrt{\frac{A_{p,0}}{A_{p,1}}}$$

where $A_{p,0} = m_0^2(1-m_1\alpha_{p,1})^2\beta^2 - m_1^2(1-m_0\alpha_{p,0})^2$ and $A_{p,1} = m_0^2\alpha_{p,0}^2(1-m_1\alpha_{p,1})^2\beta^2 - m_1^2(1-m_0\alpha_{p,0})^2\alpha_{p,1}^2$.

wherein the $m_0$ is a segmentation diagonal ratio to one diagonal of the projection quadrangle, the $m_1$ is a segmentation diagonal ratio to the other diagonal of the projection quadrangle, β is a value obtained by dividing the segmentation diagonal ratio to one diagonal of the centered quadrangle by the segmentation diagonal ratio to the other diagonal of the centered quadrangle.

The step for estimating a projection angle corresponding to each diagonal of the centered quadrangle based on the length of the projection center line may comprise estimating a projection angle by the following Equation:

$$\cos θ_i = \frac{m_{i+2}l_i - m_i l_{i+2}}{m_i m_{i+2}(l_i + l_{i+2})} d = \alpha_{p,i} d$$

wherein the $m_i$ is a segmentation diagonal ratio to one diagonal of the projection quadrangle, the $m_{i+2}$ is a segmentation diagonal ratio to the other diagonal of the projection quadrangle, the $l_i$ is a segmentation diagonal ratio to one diagonal of the centered quadrangle, the $l_{i+2}$ is a segmentation diagonal ratio to the other diagonal of the centered quadrangle, d is length of the projection center line, the $θ_i$ is a projection angle corresponding to each diagonal of the centered quadrangle, the i is 0 or 1.

The step for estimating an angle between diagonals of a projection quadrangle based on the projection angle and an angle between diagonals of the centered quadrangle may comprise estimating an angle between diagonals by the following Equation:

$$\cos φ = \cos ρ \sin θ_0 \sin θ_1 + \cos θ_0 \sin θ_1$$

wherein the ρ is an angle between the diagonals of the centered quadrangle, the φ is an angle between diagonals of the projection quadrangle, the $θ_0$ is a projection angle corresponding to one diagonal of the centered quadrangle, $θ_1$ is a projection angle corresponding to the other diagonal of the centered quadrangle.

The step for estimating a projection center point based on the projection angle, the angle between diagonals of the centered quadrangle and the angle between diagonals of the projection quadrangle may comprise estimating a projection center point by the following Equation:

$$P_c = \frac{d(\sin φ \cos θ_0 \cos θ_1 - \cos φ \cos θ_0 \sin ρ \sin θ_0 \sin θ_1)}{\sin φ}$$

wherein $P_c$ is a projection center point, the ρ is an angle between the diagonals of the centered quadrangle, the φ is an angle between diagonals of the projection quadrangle, the $θ_0$ is a projection angle corresponding to one diagonal of the centered quadrangle, $θ_1$ is a projection angle corresponding to the other diagonal of the centered quadrangle, d is length of the projection center line.

As described above, according to an embodiment of the present invention, it allows camera calibration without using a complicated 3D object nor a plurality of images for a checkerboard.

According to an embodiment of the present invention, it also facilitates to detect extrinsic parameters to express a projection center point and orientation.

According to an embodiment of the present invention, it further provides camera calibration of which calculation is not complicate and which is robust to errors.

DESCRIPTION OF THE EXEMPLARY EMBODIMENTS

The present invention will be described with reference to particular embodiments along with the accompanying drawings. However, it is to be appreciated that various changes and modifications may be made. The exemplary embodiments disclosed in the present invention do not limit but describe the spirit of the present invention, and the scope of the present invention is not limited by the exemplary embodiments. The scope of the present invention should be interpreted that all spirits equivalent to the following claims fall with the scope of the present invention.

The terms used in the description are intended to describe certain embodiments only, and shall by no means restrict the present invention. In the present description, when one element is described as "transmitting" a signal to another element, it shall be construed as transmitting to the other element directly but also as possibly having another element in between.

An apparatus for calibrating a camera according to an embodiment of the present invention recovers geometric information (diagonal angle, ratio of each segment length) of a quadrangle from a singular image of an arbitrary quadrangle of which shape information is not accurately known, recovers projection structure as a frustum based on the geometric information, calculates extrinsic parameters of a camera from the frustum, and calculates intrinsic parameters.

Figure 1:
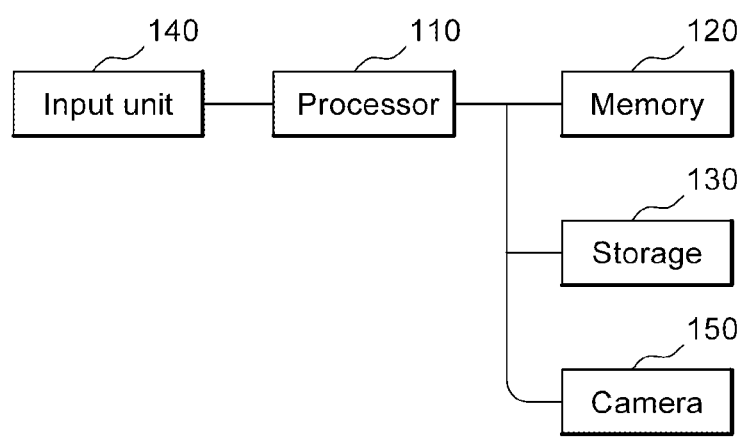
FIG. 1 illustrates an apparatus for calibrating a camera according to an embodiment of the present invention.

FIG. 1 illustrates an apparatus for calibrating a camera according to an embodiment of the present invention.

Referring to FIG. 1, an apparatus for calibrating a camera may include a processor 110, a memory 120, a storage 130, an input unit 140 and a camera 150.

The processor 110 may perform functions for camera calibration according to programs loaded in the memory 120.

The memory 120 may store programs for camera calibration and transmits a program corresponding to a request from the processor 110 to the processor 110. Here, the memory 120 may be a volatile memory.

The storage 130 may be a storing medium to store programs for camera calibration. The processor 110 may load the programs stored in the storage 130 to the memory 120. The storage 130 may store an image including an arbitrary quadrangle.

The input unit 140 may receive diagonal parameters of the original quadrangle to store them in the storage 130 by being connected to an input device (for example, an input device or an external input device installed in the apparatus for calibrating a camera).

The camera 150 may photograph an arbitrary environment quadrangle to generate an image and store the image in the storage 130. Here, the camera 150 may be a standard pin-hole model and focal distances of width and length directions may be identical with each other. Here, an environment quadrangle may be a picture or an article having a quadrangle shape to be photographed for camera calibration.

Hereinafter, a process for performing camera calibration based on the program predetermined by an apparatus for calibrating a camera according to an embodiment of the present invention will be explained in detail.

Figure 2:
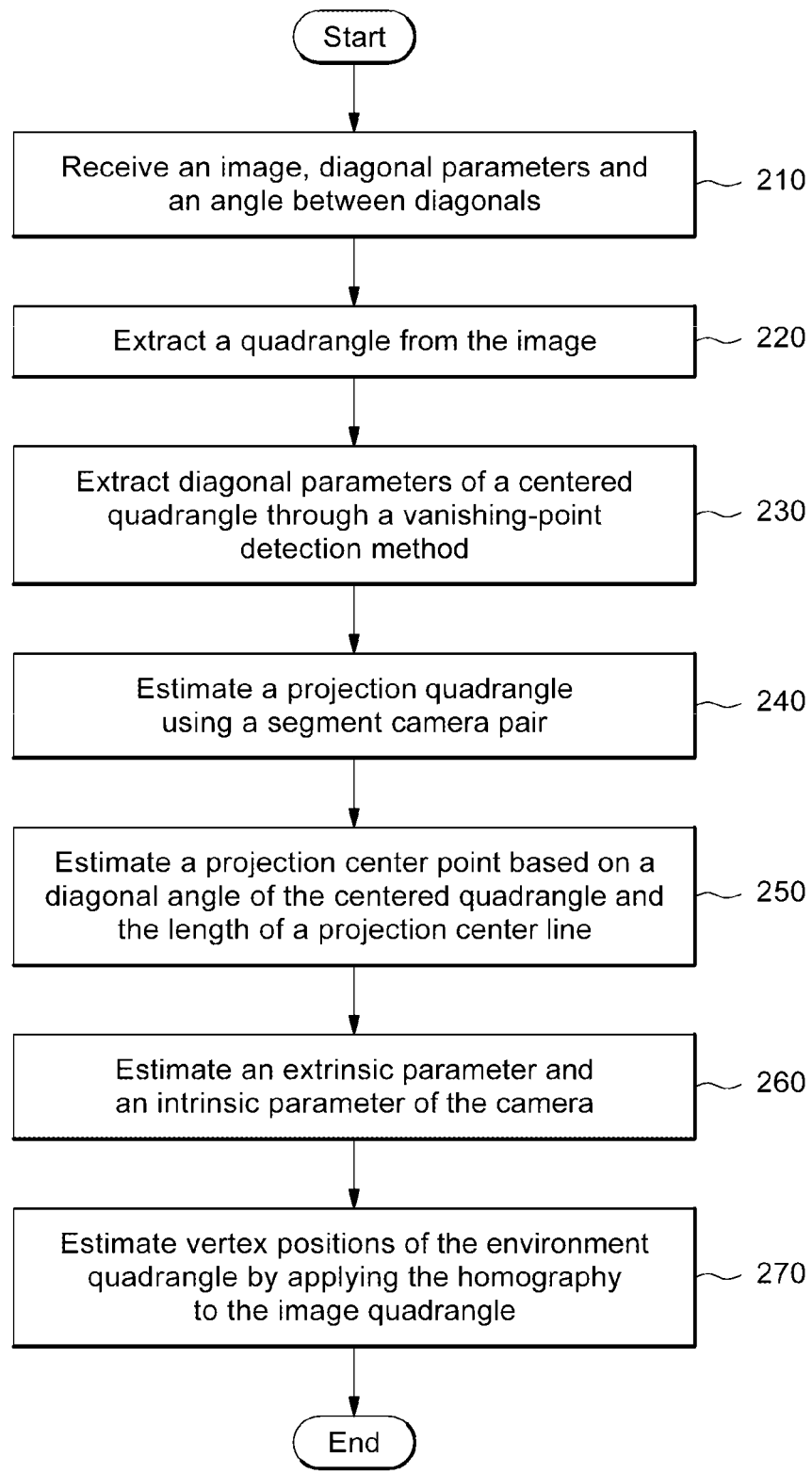
FIG. 2 is a flowchart illustrating a method for calibrating a camera using an apparatus for calibrating a camera according to an embodiment of the present invention.
Figure 3:
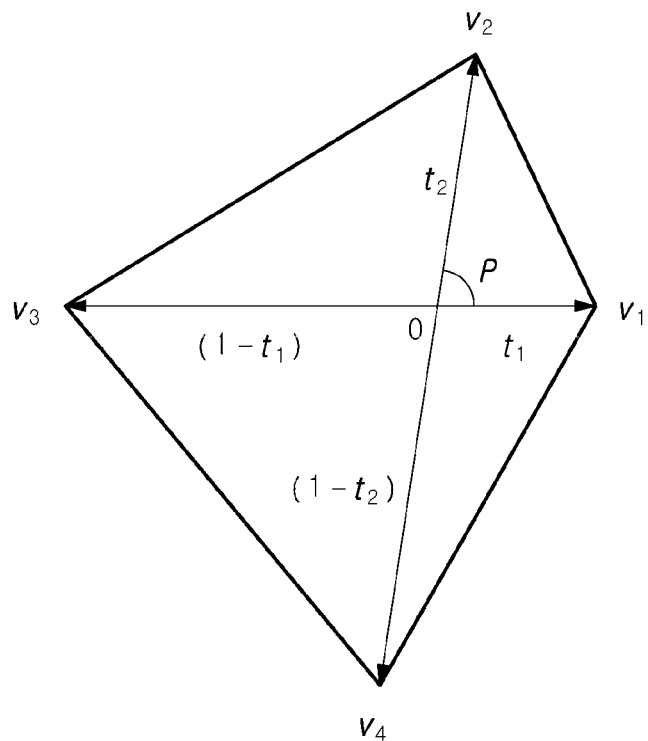
FIG. 3 is a diagram to explain diagonal parameters which an apparatus for calibrating a camera according to an embodiment of the present invention uses.

FIG. 2 is a flowchart illustrating a method for calibrating a camera using an apparatus for calibrating a camera according to an embodiment of the present invention. FIG. 3 is a diagram to explain diagonal parameters which an apparatus for calibrating a camera according to an embodiment of the present invention uses. General processes of loading programs to the memory 120 by the processor 110 and reading the programs loaded in the memory 120 by the processor 110, etc. will be omitted. An object will be called as an apparatus for calibrating a camera for simplicity and clarity of the invention.

Referring to FIG. 2, in S210, an apparatus for calibrating a camera may receive an image including an arbitrary quadrangle, diagonal parameters of an environment quadrangle (hereinafter, a real quadrangle which is an object of the image to be photographed is referred to as an environment quadrangle) and an angle between diagonals of an environment quadrangle. Referring to FIG. 3, the diagonal parameter may include a length ratio and an angle ($\rho$) between two diagonals which connect vertexes of the quadrangle. The diagonal parameter may further include a ratio between the distance from an intersection point of two diagonals (o) to one end point of the each diagonal and the distance from the intersection point to another end point of the each diagonal (hereinafter, referred to as a segmentation diagonal ratio which corresponds to $t_1$, $t_2$ in Table 1). For example, when a diagonal length between a vertex $v_1$ and a vertex $v_3$ is normalized as 1, $t_1$ is a length between the intersection point and the vertex $v_1$. When a diagonal length between a vertex $v_2$ and a vertex $v_4$ is normalized as 1, $t_2$ is a length between the intersection point and the vertex $v_2$. For example, diagonal parameters may be represented by the following Table 1 according to quadrangles.

TABLE 1

| Category | Diagonal parameters $(l_2, t_1, t_2, \rho)$ | Properties |
|---|---|---|
| Square | $(1, 0.5, 0.5, \pi/2)$ | Length of two diagonals is identical and the diagonals bisect each other, and meet at 90° |
| Rectangle | $(1, 0.5, 0.5, \rho)$ | Length of two diagonals is identical and the diagonals bisect each other |
| Rhombus | $(l_2, 0.5, 0.5, \pi/2)$ | The diagonals bisect each other and meet at 90° |
| Parallelogram | $(l_2, 0.5, 0.5, \rho)$ | The diagonals bisect each other |
| Kite | $(l_2, t_1, 0.5, \pi/2)$ or $(l_2, 0.5, t_2, \pi/2)$ | The diagonals meet at 90° and one diagonal is the perpendicular bisector of the other diagonal |
| Isosceles trapezoid | $(1, t_1, t_2, \rho)$ but, $t_1 = t_2$ or $t_1 + t_2 = 1$. | Length of two diagonals is identical and the diagonals divide each other into segments with lengths that are pairwise equal |
| Trapezoid | $(l_2, t_1, t_2, \rho)$ but, $t_1 = t_2$ or $t_1 + t_2 = 1$. | The diagonals divide each other into segments with lengths that are pairwise equal |
| Quadrangle | $(l_2, t_1, t_2, \rho)$ | No restriction |

In S220, the apparatus for calibrating a camera may extract a quadrangle from the image. Hereinafter, the quadrangle extracted from the image is called as an image quadrangle. Here, the apparatus for calibrating a camera may describe the extracted image quadrangle with 4 vertexes.

In S230, the apparatus for calibrating a camera may estimate diagonal parameters corresponding to a centered quadrangle. Here, the centered quadrangle is the quadrangle of which an intersection point of the diagonals is positioned at the center of the image. For example, the apparatus for calibrating a camera may detect a vanishing-line or two vanishing-points in the image, estimate the centered quadrangle from the image quadrangle using the vanishing-line or vanishing-points and calculate diagonal parameters of the centered quadrangle. A process for calculating diagonal parameters corresponding to the centered quadrangle by the apparatus for calibrating a camera according to an embodiment of the present invention will be explained in more detail with reference to FIG. 4 to FIG. 6 later. Here, when the image quadrangle is a pre-centered quadrangle, a process for estimating a centered quadrangle using a vanishing-point method may be omitted.

In S240, the apparatus for calibrating a camera may estimate a projection quadrangle using a segment camera pair. The apparatus for calibrating a camera may estimate length of a projection center line and a diagonal angle of the projection quadrangle using the segment camera pair and then recover the projection quadrangle based on the length of a projection center line, the diagonal angle of the projection quadrangle, and the diagonal parameter of the centered quadrangle. The projection center line is a segment connecting between the projection center point, which is the position of each segment camera, and the intersection point of two diagonals of the centered quadrangle. Here, the segment camera is a virtual camera which photographs a straight line in the environment. A process for calculating a projection quadrangle using the segment camera pair by the apparatus for calibrating a camera will be explained in more detail with reference to FIG. 7 to FIG. 14 later.

In S250, the apparatus for calibrating a camera may estimate a camera position (projection center point) based on a diagonal angle of the centered quadrangle and the length of a projection center line. It will be explained in more detail with reference to FIG. 7 to FIG. 14 later.

In S260, the apparatus for calibrating a camera may estimate an extrinsic parameter and an intrinsic parameter of the camera. The intrinsic parameter of the camera 150 may be expressed as follows:

$$K = \begin{bmatrix} f & 0 & cx \\ 0 & f & cy \\ 0 & 0 & 1 \end{bmatrix}$$

wherein, k is an intrinsic parameter, cx is a coordinate of the center point of an image for the x-axis in a predetermined coordinate, and cy is a coordinate of the center point of an image for the y-axis in a predetermined coordinate. The apparatus for calibrating a camera may thus calculate the intrinsic parameter by estimating a size of the image since cx and cy are coordinates for the center point of the image and estimating f referring to the coordinate of the centered quadrangle through a known method.

The apparatus for calibrating a camera may estimate translational transformation of the extrinsic parameter based on the projection center point and estimate rotational transformation based on a homography of the projection quadrangle and the centered quadrangle. Here, the projection quadrangle is a quadrangle expressed when the centered quadrangle is projected to the projection plane which is parallel to the environment quadrangle based on the projection center point. The apparatus for calibrating a camera may thus estimate extrinsic parameters including the projection center point, the translational transformation and the rotational transformation.

In S270, the apparatus for calibrating a camera estimate vertex positions of the environment quadrangle by applying the homography to the image quadrangle. Each vertex position of the environment quadrangle may be thus estimated by applying the homography representing the relationship between the centered quadrangle and the projection quadrangle to the image quadrangle without processing vanishing-point transformation. A process for estimating extrinsic parameters using the projection center point by the apparatus for calibrating a camera will be explained in more detail with reference to FIG. 15 to FIG. 18 later.

The apparatus for calibrating a camera according to an embodiment of the present invention may perform camera calibration using the image generated by the camera 150 and inputted diagonal parameters of the environment quadrangle.

Figure 4:
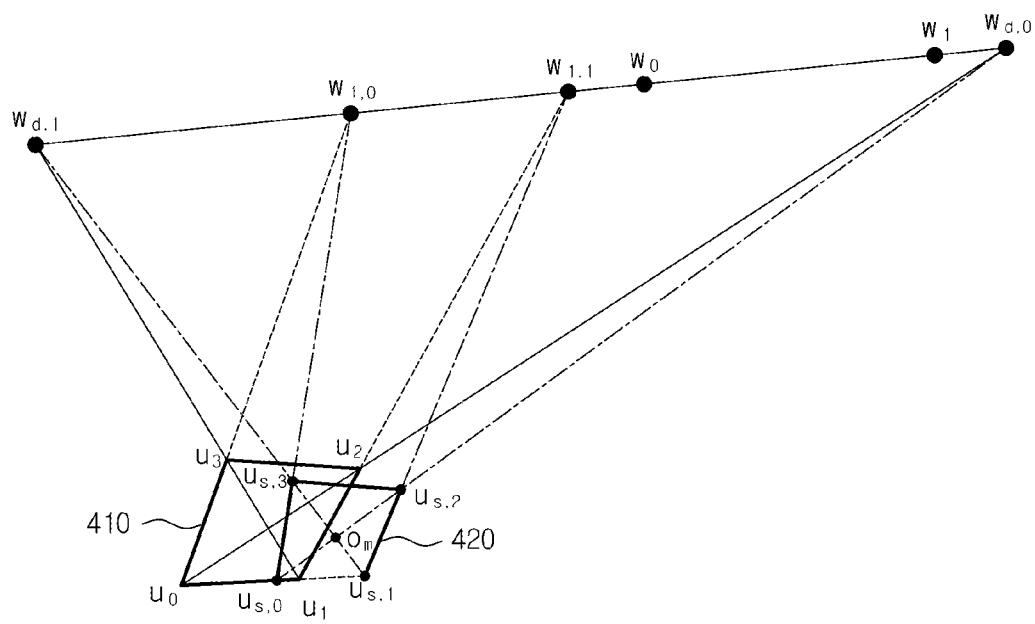
FIG. 4 is a schematic view illustrating a process for estimating a centered quadrangle by an apparatus for calibrating a camera according to an embodiment of the present invention.
Figure 5:
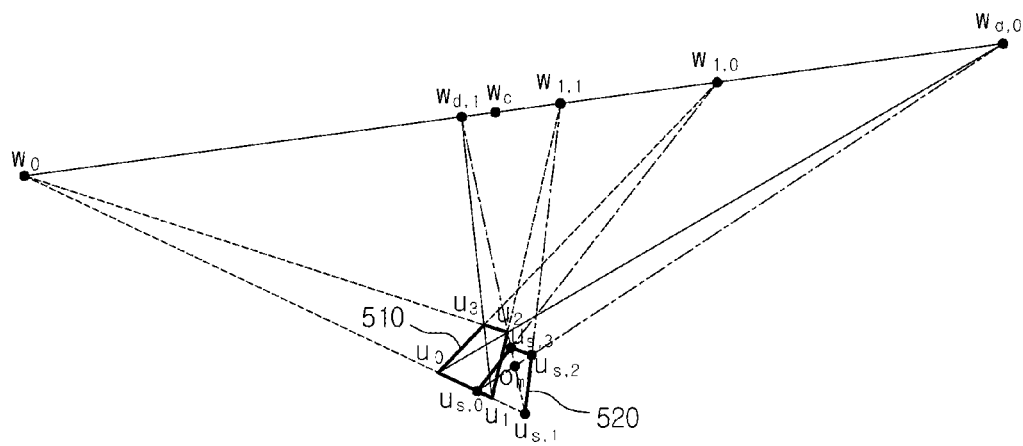
FIG. 5 is a schematic view illustrating a process for estimating a centered quadrangle for an image quadrangle which is an isosceles trapezoid by an apparatus for calibrating a camera according to an embodiment of the present invention.
Figure 6:
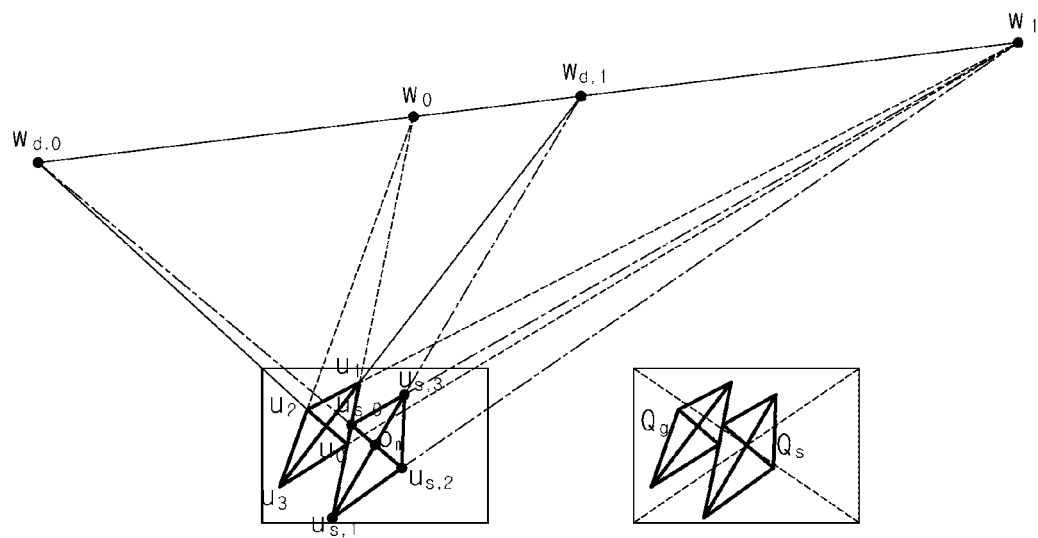
FIG. 6 is a schematic view illustrating a process for estimating a centered quadrangle for an image quadrangle which is a parallelogram by an apparatus for calibrating a camera according to an embodiment of the present invention.

FIG. 4 is a schematic view illustrating a process for estimating a centered quadrangle by an apparatus for calibrating a camera according to an embodiment of the present invention, FIG. 5 is a schematic view illustrating a process for estimating a centered quadrangle for an image quadrangle which is an isosceles trapezoid by an apparatus for calibrating a camera according to an embodiment of the present invention, and FIG. 6 is a schematic view illustrating a process for estimating a centered quadrangle for an image quadrangle which is a parallelogram by an apparatus for calibrating a camera according to an embodiment of the present invention.

Referring to FIG. 4, the apparatus for calibrating a camera may detect two vanishing-points ($W_{d,0}$, $W_{d,1}$ of FIG. 4) of an image quadrangle 410 using a known vanishing-point detection method. The apparatus for calibrating a camera may also detect first extension intersection points ($W_{1,0}$, $W_{1,1}$ of FIG. 4) which are intersection points of extension lines of each side of the image quadrangle and the segment connecting two vanishing-points. The apparatus for calibrating a camera may detect second extension intersection points ($Us_{,0}$, $Us_{,1}$ of FIG. 4) which are intersection points of the straight lines (hereinafter, referred to as centered vanishing-line), connecting each vanishing-point and the center point of the image, and the extension line of one side (side of $U_0$, $U_1$ of FIG. 4) of the image quadrangle. The apparatus for calibrating a camera may further detect third extension intersection points ($Us_{,2}$, $Us_{,3}$ of FIG. 4) which are intersection points of the straight lines, connecting each of the first extension intersection point and each of the second extension intersection point, and the centered vanishing-line. The apparatus for calibrating a camera may estimate a centered quadrangle 420 which is a quadrangle having vertexes of the second extension intersection points and the third extension intersection points. Accordingly, the apparatus for calibrating a camera may estimate diagonal parameters by obtaining four vertexes of the centered quadrangle.

When the environment quadrangle is a quadrangle having a parallel condition such as an isosceles trapezoid as shown in FIG. 5, the apparatus for calibrating a camera may detect one vanishing-point (for example, $W_{d,0}$ of FIG. 5) using a known vanishing-point detection method and detect an intersection point of the extension lines of the sides, corresponding to two sides parallel to the environment quadrangle among the sides of an image quadrangle 510, as the other vanishing-point ($W_0$ of FIG. 5). The apparatus for calibrating a camera may then estimate a centered quadrangle 520 using the detected two vanishing-points.

When the environment quadrangle is a parallelogram as shown in FIG. 6, the apparatus for calibrating a camera may detect each vanishing-point ($W_0$, $W_1$ of FIG. 6) which is each intersection point of extension lines of the sides of an image quadrangle corresponding to the parallel side pair of the environment quadrangle.

Figure 7:
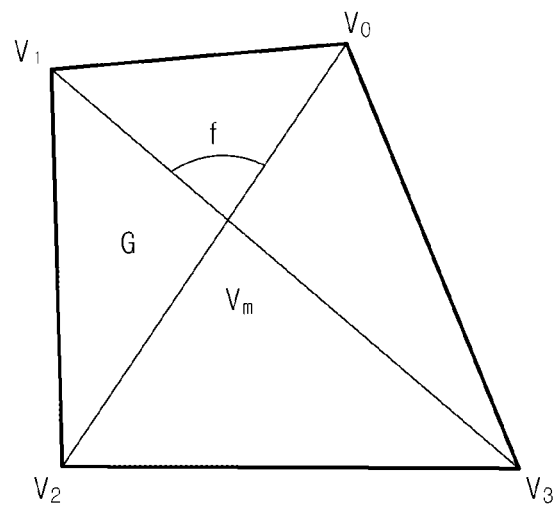
FIG. 7 illustrates a projection quadrangle estimated by an apparatus for calibrating a camera according to an embodiment of the present invention.
Figure 8:
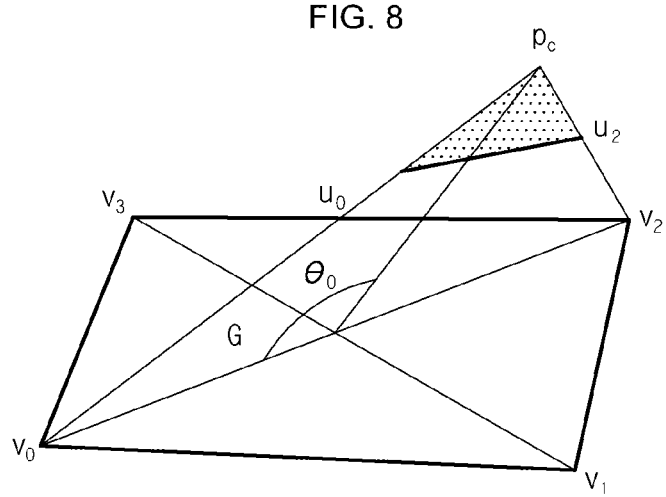
FIG. 8 illustrates a case where a projection quadrangle is photographed by a first segment camera which an apparatus for calibrating a camera according to an embodiment of the present invention assumes.
Figure 9:
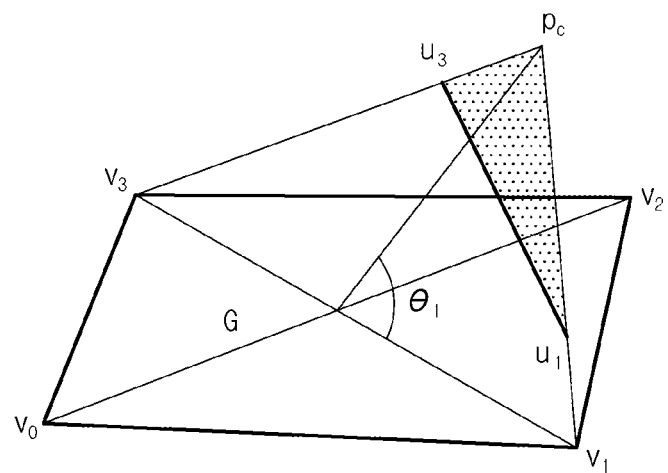
FIG. 9 illustrates a case where a projection quadrangle is photographed by a second segment camera which an apparatus for calibrating a camera according to an embodiment of the present invention assumes.
Figure 10:
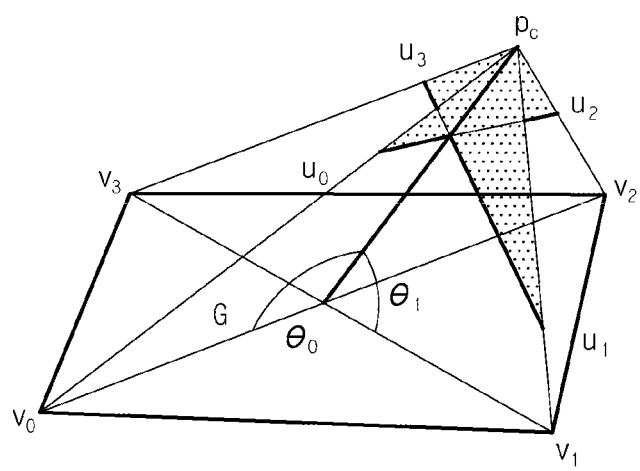
FIG. 10 illustrates a case where a projection quadrangle is photographed by a first segment camera and a second segment camera which an apparatus for calibrating a camera according to an embodiment of the present invention assumes.
Figure 11:
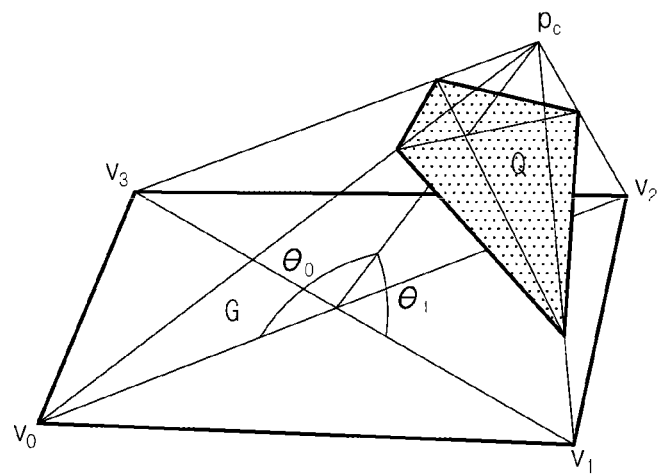
FIG. 11 illustrates geometric relationship of a projection center line, a centered quadrangle and a projection quadrangle which are used by an apparatus for calibrating a camera according to an embodiment of the present invention.
Figure 12:
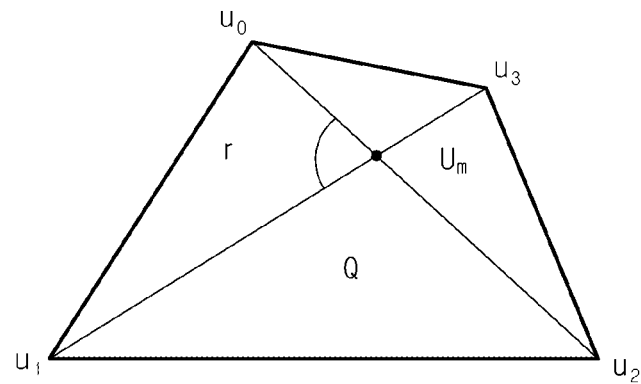
FIG. 12 illustrates a centered quadrangle which an apparatus for calibrating a camera according to an embodiment of the present invention estimates.
Figure 13:
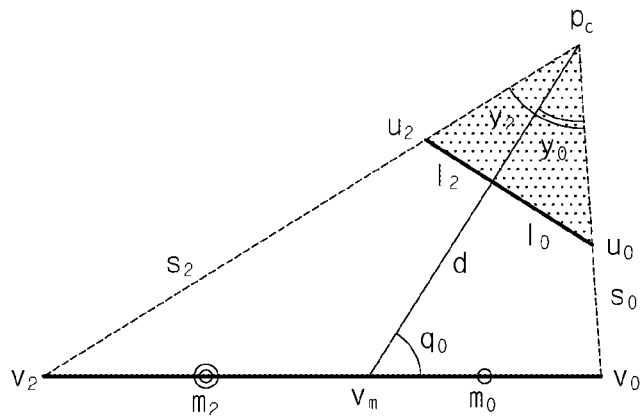
FIG. 13 illustrates a case where an environment quadrangle is photographed by a first segment camera which an apparatus for calibrating a camera according to an embodiment of the present invention assumes.
Figure 14:
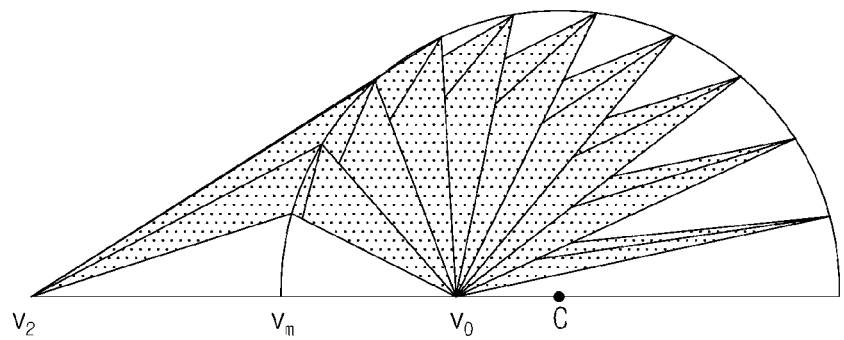
FIG. 14 illustrates a projection center point of a segment camera which an apparatus for calibrating a camera according to an embodiment of the present invention assumes.

FIG. 7 illustrates a projection quadrangle estimated by an apparatus for calibrating a camera according to an embodiment of the present invention, FIG. 8 illustrates a case where a projection quadrangle is photographed by a first segment camera which an apparatus for calibrating a camera according to an embodiment of the present invention assumes, FIG. 9 illustrates a case where a projection quadrangle is photographed by a second segment camera which an apparatus for calibrating a camera according to an embodiment of the present invention assumes, FIG. 10 illustrates a case where a projection quadrangle is photographed by a first segment camera and a second segment camera which an apparatus for calibrating a camera according to an embodiment of the present invention assumes, FIG. 11 illustrates geometric relationship of a projection center line, a centered quadrangle and a projection quadrangle which are used by an apparatus for calibrating a camera according to an embodiment of the present invention, FIG. 12 illustrates a centered quadrangle which an apparatus for calibrating a camera according to an embodiment of the present invention estimates, FIG. 13 illustrates a case where an environment quadrangle is photographed by a first segment camera which an apparatus for calibrating a camera according to an embodiment of the present invention assumes, and FIG. 14 illustrates a projection center point of a segment camera which an apparatus for calibrating a camera according to an embodiment of the present invention assumes.

Referring to FIG. 7, when it is assumed that a projection quadrangle ($V_0$, $V_1$, $V_2$, $V_3$) is a quadrangle having Vm of an intersection point of diagonals and f of an angle of diagonals, a process for photographing an image quadrangle through a segment camera pair will be explained below. Here, since the segment camera is a virtual camera to explain operation principle of an apparatus for calibrating a camera according to an embodiment of the present invention, the apparatus for calibrating a camera does not perform actual photographing through the segment camera.

It is assumed that the apparatus for calibrating a camera lets two virtual segment cameras photograph each diagonal of an environment quadrangle at a projection center point $P_c$. Length of a projection center line may be estimated using a diagonal length of the image, which each segment camera photographed (that is a diagonal length of a centered quadrangle), and a diagonal length of the environment quadrangle. Referring to FIG. 8 and FIG. 9, it is assumed that each segment camera photographs each diagonal of a projection quadrangle at a projection center point. That is, a first segment camera may be a segment camera which photographs to form a projection center line to be an angle of $\theta_0$ with one diagonal of the projection quadrangle and a second segment camera may be a segment camera which photographs to form a projection center line to be an angle of $\theta_1$ with the other diagonal of the projection quadrangle.

Referring to FIG. 10, the segments photographed by the first segment camera and the second segment camera cross with each other and a centered quadrangle, of which diagonals are the segments, may be projected and generated as an image as shown in FIG. 11. Thus, when the environment quadrangle is photographed, the image including the centered quadrangle may be generated as shown in FIG. 12.

Here, the apparatus for calibrating a camera may calculate length of the projection center line ($P_c$, $V_m$) based on geometric relationship between the projection quadrangle ($V_0$, $V_1$, $V_2$, $V_3$) and the centered quadrangle ($U_0$, $U_1$, $U_2$, $U_3$).

Referring to FIG. 13, a projection type for the diagonal of the environment quadrangle of the first segment camera may be represented by a planar triangle, not three-dimensional triangle. Here, the projection type for the diagonal of the environment quadrangle of the second segment camera may be also represented by a planar triangle as shown in FIG. 13. When $m_0$, $m_2$, $l_0$, and $l_2$ are known and all points which can be projection centers of the first segment camera are represented according to the geometric relationship, a sphere having a center point C may be formed as shown in FIG. 14. When a segmentation diagonal ratio of the projection quadrangle ($m_0:m_2$) and a segmentation diagonal ratio of the centered quadrangle ($l_0$:$l_2$) are known, a projection center of the segment camera photographing diagonal of the projection quadrangle may be a certain point on one sphere. Therefore, any one point, which is a projection center corresponding to the first segment camera and the second segment camera, among intersection cycles which are formed with intersection points of the sphere may be a common projection center of the first segment camera and the second segment camera. Here, it is assumed that the segmentation diagonal ratio of the projection quadrangle is identical to the segmentation diagonal ratio of the environment quadrangle. Accordingly, the following Equation 1 may be provided using each segmentation diagonal ratio of the projection quadrangle and the centered quadrangle and the length of the projection center line:

$$\cos\theta_i = \frac{m_{i+2}l_i - m_i l_{i+2}}{m_i m_{i+2}(l_i + l_{i+2})}d = \alpha_{p,i}d \quad [\text{Equation 1}]$$

wherein $m_i$ is a segmentation diagonal ratio to one diagonal of the projection quadrangle, $m_{i+2}$ is a segmentation diagonal ratio to the other diagonal of the projection quadrangle (Here, i is 0 or 1), $l_i$ is the segmentation diagonal ratio for one diagonal of the centered quadrangle, $l_{i+2}$ is a segmentation diagonal ratio to the other diagonal of the centered quadrangle, d is a length of a projection center line. $\theta_0$ is an angle between the diagonal which the first segment camera photographs and the projection center line, $\theta_1$ is an angle between the diagonal which the second segment camera photographs and the projection center line.

$$\beta = \frac{l_1}{l_0} = \frac{m_1 \sin\theta_i}{m_0 \sin\theta_0} \frac{(d - m_0\cos\theta_0)}{(d - m_1\cos\theta_1)} \quad [\text{Equation 2}]$$

wherein, $l_0$ is a distance between one end of the diagonal of the image generated through the first segment camera (the segment camera which photographs the diagonal ($V_0$, $V_2$) of the projection quadrangle) and the intersection point of the diagonals of the centered quadrangle, $l_1$ is a distance between one end of the diagonal of the image generated through the second segment camera (the segment camera which photographs the diagonal ($V_1$, $V_3$) of the projection quadrangle) and the intersection point of the diagonals of the centered quadrangle. $m_0$ is a distance between the intersection point of the diagonals of the projection quadrangle and the diagonal ($V_0$, $V_2$) and $m_1$ is a distance between the intersection point of the diagonals of the projection quadrangle and the diagonal ($V_1$, $V_3$).

Equation 3 may be provided by applying the Equation 2 to the Equation 1.

$$d = \sqrt{\frac{A_{p,0}}{A_{p,1}}} \quad [\text{Equation 3}]$$

where $A_{p,0} = m_0^2(1 - m_1\alpha_{p,1})^2\beta^2 - m_1^2(1 - m_0\alpha_{p,0})^2$
and $A_{p,1} = m_0^2\alpha_{p,0}^2(1 - m_1\alpha_{p,1})^2\beta^2 - m_1^2(1 - m_0\alpha_{p,0})^2\alpha_{p,1}^2$.

Accordingly, the apparatus for calibrating a camera may calculate a length of the projection center line using the segmentation diagonal ratio of the centered quadrangle and the segmentation diagonal ratio of the projection quadrangle.

The apparatus for calibrating a camera may then calculate $\theta_0$ and $\theta_1$ which are angles between the diagonal of each segment camera and the projection center line by applying the length of the projection center line to the Equation 1.

The apparatus for calibrating a camera may further calculate a diagonal angle of the projection quadrangle by applying $\theta_0$ and $\theta_1$ to the following Equation 4.

$$\cos\phi = \cos\rho \sin\theta_0 \sin\theta_1 + \cos\theta_0 \sin\theta_1 \quad [\text{Equation 4}]$$

Here, $\rho$ is a diagonal angle of the centered quadrangle and $\phi$ is a diagonal angle of the projection quadrangle.

The apparatus for calibrating a camera may calculate a projection center point ($P_c$) using the following Equation 5.

$$P_c = \frac{d(\sin\phi\cos\theta_0\cos\theta_1 - \cos\phi\cos\theta_0\sin\rho\sin\theta_0\sin\theta_1)}{\sin\phi} \quad [\text{Equation 5}]$$

Hereinafter, a process for recovering the environment quadrangle using the centered quadrangle and the projection quadrangle by the apparatus for calibrating a camera will be explained below.

Figure 15:
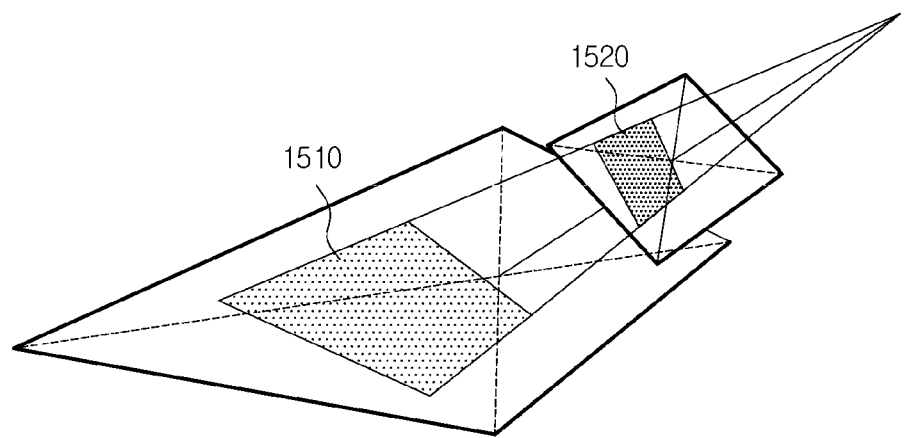
FIG. 15 illustrates geometric relationship between an environment quadrangle and an image quadrangle which an apparatus for calibrating a camera according to an embodiment of the present invention inputs.
Figure 16:
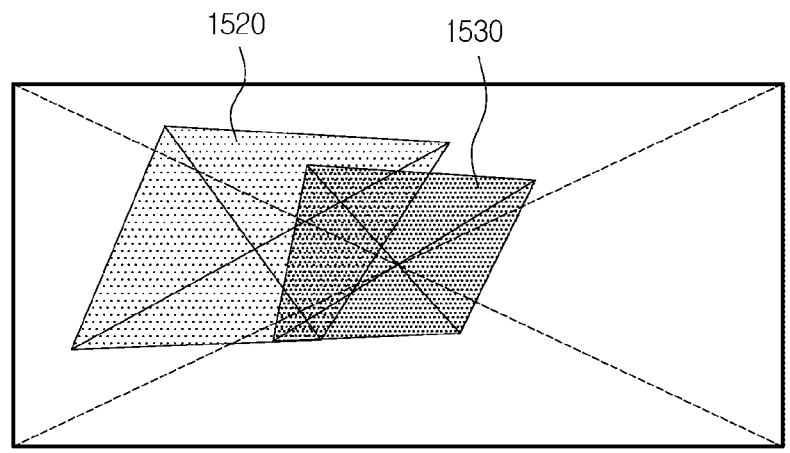
FIG. 16 illustrates a centered quadrangle which an apparatus for calibrating a camera according to an embodiment of the present invention generates.
Figure 17:
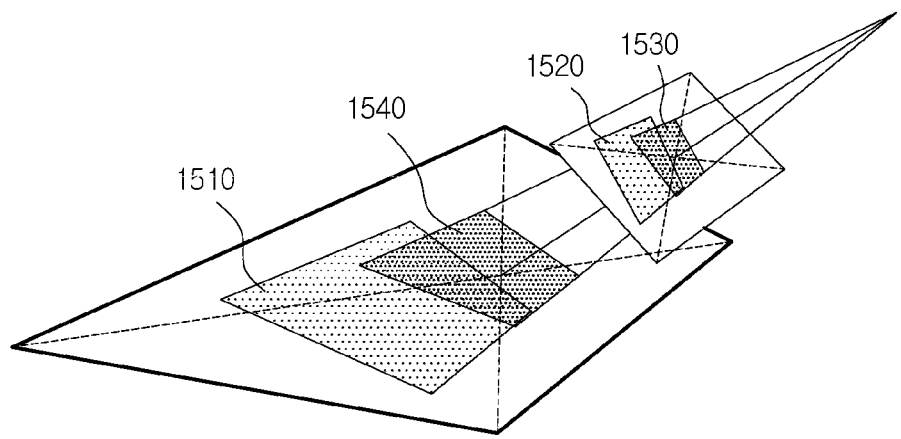
FIG. 17 illustrates geometric relationship between an image quadrangle and an environment quadrangle which an apparatus for calibrating a camera according to an embodiment of the present invention inputs, a centered quadrangle and a projection quadrangle.
Figure 18:
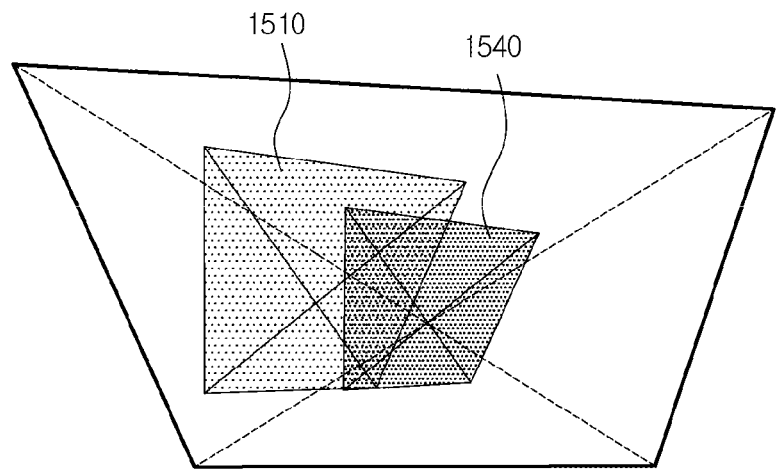
FIG. 18 is a plan view illustrating an environment quadrangle and a projection quadrangle which an apparatus for calibrating a camera according to an embodiment of the present invention estimates.

FIG. 15 illustrates geometric relationship between an environment quadrangle and an image quadrangle which an apparatus for calibrating a camera according to an embodiment of the present invention inputs, FIG. 16 illustrates a centered quadrangle which an apparatus for calibrating a camera according to an embodiment of the present invention generates, FIG. 17 illustrates geometric relationship between an image quadrangle and an environment quadrangle which an apparatus for calibrating a camera according to an embodiment of the present invention inputs, a centered quadrangle and a projection quadrangle, and FIG. 18 is a plan view illustrating an environment quadrangle and a projection quadrangle which an apparatus for calibrating a camera according to an embodiment of the present invention estimates.

The apparatus for calibrating a camera according to an embodiment of the present invention may extract an image quadrangle 1520 from an image generated by photographing an environment quadrangle 1510 as shown in FIG. 15. The apparatus for calibrating a camera may estimate a centered quadrangle 1530 from the image quadrangle 1520 using vanishing-points as shown in FIG. 16. The apparatus for calibrating a camera may also estimate a projection quadrangle 1540 from the centered quadrangle 1530 through concept of using a virtual segment camera as shown in FIG. 17. Here, the apparatus for calibrating a camera may estimate a homography between the centered quadrangle 1530 and the projection quadrangle 1540. The apparatus for calibrating a camera may recover the environment quadrangle 1510 by applying the homography to the image quadrangle 1520. As shown in FIG. 18, geometric relationship between the projection quadrangle 1540, which is a similar figure to the environment quadrangle 1510, and the centered quadrangle 1530 is almost similar to that between the environment quadrangle 1510 and the image quadrangle 1520. Therefore, the apparatus for calibrating a camera may recover the environment quadrangle 1510 from the image quadrangle 1520 using the homography between the centered quadrangle 1530 and the projection quadrangle 1540.

The apparatus for calibrating a camera may be used for image-based building modeling using a quadrocopter or mobile document scanners.

For example, the apparatus for calibrating a camera according to an embodiment of the present invention may be used for image-based building modeling using a quadrocopter as follows.

| | |
|---|---|
| Summary | Image-based modeling technology for buildings having many quadrangle elements using a quadrocopter. A quadrocopter equipped with a camera identifies its own position while flying around a building, and obtains dense images of the building through sequential photographing features (e.g., walls, windows and the like). 3D image-based modeling is performed for the building by connecting those pictures. |
| System construction | Quadrangle information, mainly rectangular information of the building is used but length of a segmentation diagonal using an original building plan is used when it available. A camera of which lens distortion is calibrated. A self-driving or human-driven quadrocopter equipped with a camera Application software and drive server: processes images when the quadrocopter transmits photographed images, extracts features(quadrangles), controls position of the quadrocopter, plans a next shooting position, and performs image-based modeling by assembling the photographed images. |
| Terminal and application | Basically constructed of the quadrocopter and drive software Photographing a building (or an equivalent rectangular) and transmitting the image to the server through WiBro and WiFi communication methods. |
| System service | The transmitted images are analyzed using the method of the present invention and a shooting position of the quadrocopter is obtained. The images are assembled and the next shooting position of the quadrocopter is determined and the quadrocopter is moved. |

The apparatus for calibrating a camera according to an embodiment of the present invention may be used for a mobile document scanner as shown the following Table.

| | |
|---|---|
| Summary | Various rectangular documents (prints, cards, books, etc.) of which aspect ratios are not known are photographed and recovered in rectangular forms of images. It is not necessary to know aspect ratios of the documents in advance during this process, One image is enough. |
| System construction | A smartphone equipped with a camera Core function software: extracts and processes quadrangle areas from images when a user photographs documents and recovers the images by calculating aspect ratios of the rectangulars. |
| Additional functions | Result may be better when lens distortion of the smartphone is calibrated. Quality of the image may be improved though texture filtering when the identical document is photographed from different angles. The user may actively set or correct a quadrangle area. |

Figure 19:
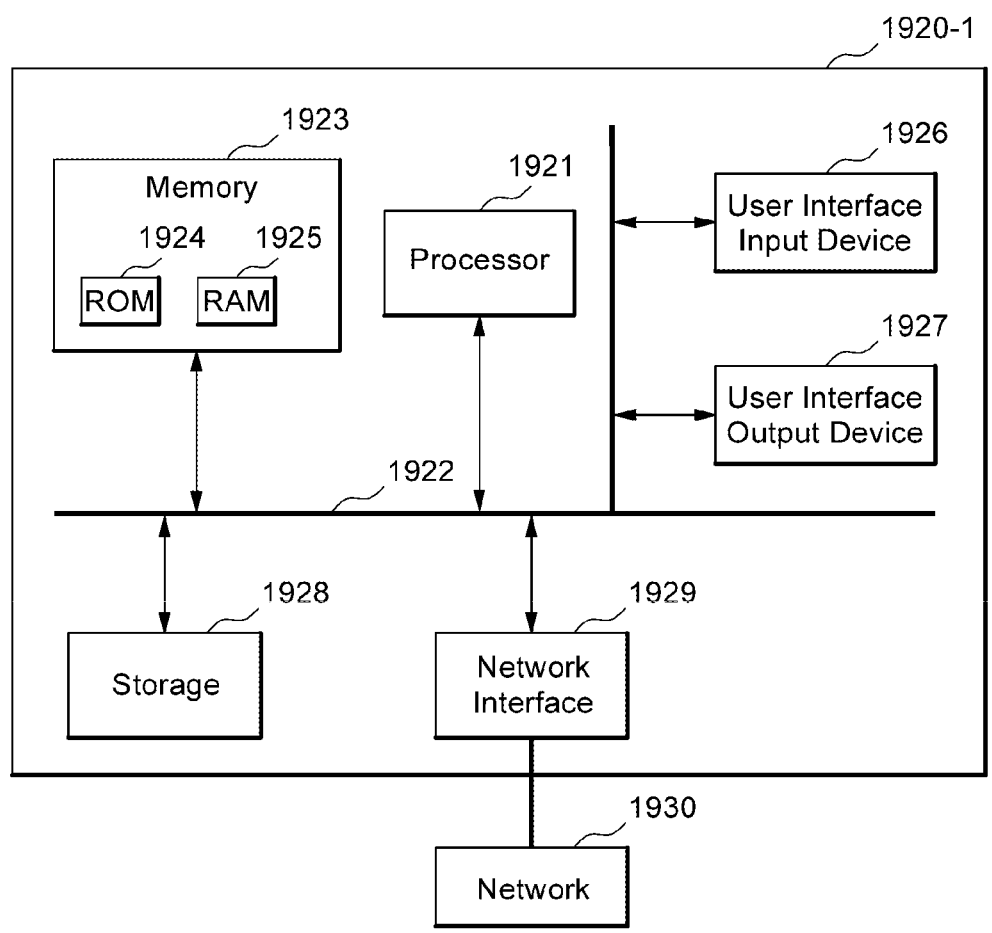
FIG. 19 illustrates the computer system implemented with the apparatus for calibrating a camera in accordance with an embodiment of the present invention.

FIG. 19 illustrates the computer system implemented with the apparatus for calibrating a camera in accordance with an embodiment of the present invention.

An embodiment of the present invention may be implemented in a computer system, e.g., as a computer readable medium. As shown in in FIG. 1900, a computer system 1920-1 may include one or more of a processor 1921, a memory 1923, a user input device 1926, a user output device 1927, and a storage 1928, each of which communicates through a bus 1922. The computer system 1920-1 may also include a network interface 1929 that is coupled to a network 1930. The processor 1921 may be a central processing unit (CPU) or a semiconductor device that executes processing instructions stored in the memory 1923 and/or the storage 1928. The memory 1923 and the storage 1928 may include various forms of volatile or non-volatile storage media. For example, the memory may include a read-only memory (ROM) 1924 and a random access memory (RAM) 1925.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

The spirit of the present invention has been described by way of example hereinabove, and the present invention may be variously modified, altered, and substituted by those skilled in the art to which the present invention pertains without departing from essential features of the present invention. As such, many embodiments other than that set forth above can be found in the appended claims. Accordingly, the exemplary embodiments disclosed in the present invention and the accompanying drawings do not limit but describe the spirit of the present invention, and the scope of the present invention is not limited by the exemplary embodiments and accompanying drawings. The scope of the present invention should be interpreted by the following claims and it should be interpreted that all spirits equivalent to the following claims fall within the scope of the present invention.

What is claimed is:

1. An apparatus for calibrating a camera comprising:
a camera configured to generate an image quadrangle in an image by photographing an environment quadrangle;
an input unit configured to receive a segmentation diagonal ratio of the environment quadrangle;
a processor;
a non-transitory computer-readable medium whose contents, when executed by the processor, cause the processor to perform camera calibration operations, the camera calibration operations comprising:
generating a centered quadrangle using first and second vanishing lines, the first and second vanishing lines connecting a center of the image to a pair of vanishing points;
extracting diagonal parameters of the centered quadrangle from the image
estimating a length of a projection center line based on the segmentation diagonal ratio of the environment quadrangle and the diagonal parameters of the centered quadrangle;
estimating a projection angle corresponding to each diagonal of the centered quadrangle based on the length of the projection center line;
estimating an angle between diagonals of a projection quadrangle based on the projection angle and an angle between diagonals of the centered quadrangle;
estimating a projection center point based on the projection angle, the angle between diagonals of the centered quadrangle and the angle between diagonals of the projection quadrangle; and
estimating extrinsic and intrinsic parameters of the camera corresponding to the projection center point and the centered quadrangle,
wherein the centered quadrangle is generated by:
detecting first extension intersection points, the first extension intersection points being intersections of extension lines of each side of the image quadrangle and a segment connecting two vanishing points;

detecting second extension intersection points, the second extension intersection points being intersections of the vanishing lines and one of the extension lines; and detecting third extension intersection points, the third extension intersection points being intersections of the centered vanishing lines and lines connecting the first and second extension intersection points, and wherein the second and third extension intersection points are vertices of the centered quadrangle.

2. The apparatus for calibrating a camera of claim 1, wherein the diagonal parameter comprises the angle between diagonals of the centered quadrangle and the segmentation diagonal ratio.

3. The apparatus for calibrating a camera of claim 1, wherein the projection angle is an angle between the projection center line and the diagonal of the environment quadrangle.

4. The apparatus for calibrating a camera of claim 1, wherein the camera calibration operations further comprise:
estimating a homography between the centered quadrangle and the projection quadrangle; and
recovering the environment quadrangle by applying the homography to the image quadrangle.

5. The apparatus for calibrating a camera of claim 1, wherein the length of the projection center line is estimated by the following Equation:

$$d = \sqrt{\frac{A_{p,0}}{A_{p,1}}}$$

where $A_{p,0} = m_0^2(1 - m_1\alpha_{p,1})^2\beta^2 - m_1^2(1 - m_0\alpha_{p,0})^2$
and $A_{p,1} = m_0^2\alpha_{p,0}^2(1 - m_1\alpha_{p,1})^2\beta^2 - m_1^2(1 - m_0\alpha_{p,0})^2\alpha_{p,1}^2$.

wherein the $m_0$ is a segmentation diagonal ratio to one diagonal of the projection quadrangle, the $m_1$ is a segmentation diagonal ratio to the other diagonal of the projection quadrangle, and $\beta$ is a value obtained by dividing the segmentation diagonal ratio to one diagonal of the centered quadrangle by the segmentation diagonal ratio to the other diagonal of the centered quadrangle.

6. The apparatus for calibrating a camera of claim 1, wherein the projection angle is estimated by the following Equation:

$$\cos\theta_i = \frac{m_{i+2}l_i - m_i l_{i+2}}{m_i m_{i+2}(l_i + l_{i+2})} d = \alpha_{p,i} d$$

wherein the $m_i$ is a segmentation diagonal ratio to one diagonal of the projection quadrangle, the $m_{i+2}$ is a segmentation diagonal ratio to the other diagonal of the projection quadrangle, the $l_i$ is a segmentation diagonal ratio to one diagonal of the centered quadrangle, the $l_{i+2}$ is a segmentation diagonal ratio to the other diagonal of the centered quadrangle, d is length of the projection center line, the $\theta_i$ is a projection angle corresponding to each diagonal of the centered quadrangle, the i is 0 or 1.

7. The apparatus for calibrating a camera of claim 1, wherein the angle between the diagonals is estimated by the following Equation:

$$\cos\phi = \cos\rho\sin\theta_0\sin\theta_1 + \cos\theta_0\sin\theta_1$$

wherein the $\rho$ is an angle between the diagonals of the centered quadrangle, the $\phi$ is an angle between diagonals of the projection quadrangle, the $\theta_0$ is a projection angle corresponding to one diagonal of the centered quadrangle, $\theta_1$ is a projection angle corresponding to the other diagonal of the centered quadrangle.

8. The apparatus for calibrating a camera of claim 1, wherein the projection center point is estimated by the following Equation:

$$P_c = \frac{d(\sin\phi\cos\theta_0\cos\theta_1 - \cos\phi\cos\theta_0\sin\rho\sin\theta_0\sin\theta_1)}{\sin\phi}$$

wherein $P_c$ is a projection center point, the $\rho$ is an angle between the diagonals of the centered quadrangle, the $\phi$ is an angle between diagonals of the projection quadrangle, the $\theta_0$ is a projection angle corresponding to one diagonal of the centered quadrangle, $\theta_1$ is a projection angle corresponding to the other diagonal of the centered quadrangle, d is length of the projection center line.

9. A method for calibrating a camera in which an apparatus for calibrating a camera performs camera calibration, the method comprising:
receiving an image quadrangle of an environment quadrangle in an image and a segmentation diagonal ratio of the environment quadrangle;
generating a centered quadrangle using first and second vanishing lines, the first and second vanishing lines connecting a center of the image to a pair of vanishing points;
extracting diagonal parameters of the centered quadrangle from the image;
estimating length of a projection center line based on the segmentation diagonal ratio of the environment quadrangle and the diagonal parameters of the centered quadrangle;
estimating a projection angle corresponding to each diagonal of the centered quadrangle based on the length of the projection center line;
estimating an angle between diagonals of a projection quadrangle based on the projection angle and an angle between diagonals of the centered quadrangle;
estimating a projection center point based on the projection angle, the angle between diagonals of the centered quadrangle and the angle between diagonals of the projection quadrangle; and
estimating extrinsic and intrinsic parameters of the camera corresponding to the projection center point and the centered quadrangle,
wherein the centered quadrangle is generated by:
detecting first extension intersection points, the first extension intersection points being intersections of extension lines of each side of the image quadrangle and a segment connecting two vanishing points;
detecting second extension intersection points, the second extension intersection points being intersections of the vanishing lines and one of the extension lines; and
detecting third extension intersection points, the third extension intersection points being intersections of the centered vanishing lines and lines connecting the first and second extension intersection points, and
wherein the second and third extension intersection points are vertices of the centered quadrangle.

10. The method for calibrating a camera of claim 9, wherein the diagonal parameter comprises the angle between diagonals of the centered quadrangle and the segmentation diagonal ratio.

11. The method for calibrating a camera of claim 9, wherein the projection angle is an angle between the projection center line and the diagonal of the environment quadrangle.

12. The method for calibrating a camera of claim 9, further comprising:
estimating a homography between the centered quadrangle and the projection quadrangle; and
recovering the environment quadrangle by applying the homography to the image quadrangle.

13. The method for calibrating a camera of claim 9, wherein the step for estimating length of a projection center line based on the segmentation diagonal ratio of the environment quadrangle and the diagonal parameters of the centered quadrangle comprises estimating length of a projection center line by the following Equation:

$$d = \sqrt{\frac{A_{p,0}}{A_{p,1}}}$$

where $A_{p,0} = m_0^2(1 - m_1\alpha_{p,1})^2\beta^2 - m_1^2(1 - m_0\alpha_{p,0})^2$
and $A_{p,1} = m_0^2\alpha_{p,0}^2(1 - m_1\alpha_{p,1})^2\beta^2 - m_1^2(1 - m_0\alpha_{p,0})^2\alpha_{p,1}^2$.

wherein the $m_0$ is a segmentation diagonal ratio to one diagonal of the projection quadrangle, the $m_1$ is a segmentation diagonal ratio to the other diagonal of the projection quadrangle, $\beta$ is a value obtained by dividing the segmentation diagonal ratio to one diagonal of the centered quadrangle by the segmentation diagonal ratio to the other diagonal of the centered quadrangle.

14. The method for calibrating a camera of claim 9, wherein the step for estimating a projection angle corresponding to each diagonal of the centered quadrangle based on the length of the projection center line comprises estimating a projection angle by the following Equation:

$$\cos\theta_i = \frac{m_{i+2}l_i - m_i l_{i+2}}{m_i m_{i+2}(l_i + l_{i+2})} d = \alpha_{p,i} d$$

wherein the $m_i$ is a segmentation diagonal ratio to one diagonal of the projection quadrangle, the $m_i+2$ is a segmentation diagonal ratio to the other diagonal of the projection quadrangle, the $l_i$ is a segmentation diagonal ratio to one diagonal of the centered quadrangle, the $l_i+2$ is a segmentation diagonal ratio to the other diagonal of the centered quadrangle, d is length of the projection center line, the $\theta_i$ is a projection angle corresponding to each diagonal of the centered quadrangle, the i is 0 or 1.

15. The method for calibrating a camera of claim 9, wherein the step for estimating an angle between diagonals of a projection quadrangle based on the projection angle and an angle between diagonals of the centered quadrangle comprises estimating an angle between diagonals by the following Equation:

$$\cos\phi = \cos\rho \sin\theta_0 \sin\theta_1 + \cos\theta_0 \sin\theta_1$$

wherein the $\rho$ is an angle between the diagonals of the centered quadrangle, the $\phi$ is an angle between diagonals of the projection quadrangle, the $\theta_0$ is a projection angle corresponding to one diagonal of the centered quadrangle, $\theta_1$ is a projection angle corresponding to the other diagonal of the centered quadrangle.

16. The method for calibrating a camera of claim 9, wherein the step for estimating a projection center point based on the projection angle, the angle between diagonals of the centered quadrangle and the angle between diagonals of the projection quadrangle comprises estimating a projection center point by the following Equation:

$$P_c = \frac{d(\sin\phi\cos\theta_0\cos\theta_1 - \cos\phi\cos\theta_0\sin\rho\sin\theta_0\sin\theta_1)}{\sin\phi}$$

wherein $P_c$ is a projection center point, the $\rho$ is an angle between the diagonals of the centered quadrangle, the $\phi$ is an angle between diagonals of the projection quadrangle, the $\theta_0$ is a projection angle corresponding to one diagonal of the centered quadrangle, $\theta_1$ is a projection angle corresponding to the other diagonal of the centered quadrangle, d is length of the projection center line.

17. A method for calibrating a camera in which an apparatus for calibrating a camera performs camera calibration, the method comprising:
receiving an image of an environment quadrangle and a segmentation diagonal ratio of the environment quadrangle;
extracting diagonal parameters of a centered quadrangle from the image;
estimating length of a projection center line based on the segmentation diagonal ratio of the environment quadrangle and the diagonal parameters of the centered quadrangle;
estimating a projection angle corresponding to each diagonal of the centered quadrangle based on the length of the projection center line;
estimating an angle between diagonals of a projection quadrangle based on the projection angle and an angle between diagonals of the centered quadrangle;
estimating a projection center point based on the projection angle, the angle between diagonals of the centered quadrangle and the angle between diagonals of the projection quadrangle; and
estimating extrinsic and intrinsic parameters of the camera corresponding to the projection center point and the centered quadrangle,
wherein the step for estimating length of a projection center line based on the segmentation diagonal ratio of the environment quadrangle and the diagonal parameters of the centered quadrangle comprises estimating length of a projection center line by the following Equation:

$$d = \sqrt{\frac{A_{p,0}}{A_{p,1}}}$$

where $A_{p,0} = m_0^2(1 - m_1\alpha_{p,1})^2\beta^2 - m_1^2(1 - m_0\alpha_{p,0})^2$
and $A_{p,1} = m_0^2\alpha_{p,0}^2(1 - m_1\alpha_{p,1})^2\beta^2 - m_1^2(1 - m_0\alpha_{p,0})^2\alpha_{p,1}^2$.

wherein the $m_0$ is a segmentation diagonal ratio to one diagonal of the projection quadrangle, the $m_1$ is a segmentation diagonal ratio to the other diagonal of the projection quadrangle, $\beta$ is a value obtained by dividing the segmentation diagonal ratio to one diagonal of the centered quadrangle by the segmentation diagonal ratio to the other diagonal of the centered quadrangle.

18. The method for calibrating a camera of claim 17, further comprising:
estimating a homography between the centered quadrangle and the projection quadrangle; and
recovering the environment quadrangle by applying the homography to the image quadrangle.

\* \* \* \* \*